United States Patent [19]

Doherty et al.

[11] 4,281,979
[45] Aug. 4, 1981

[54] APPARATUS TO FORM A FLAT-TOPPED RIM ON A THIN-WALLED FOAM PLASTIC CONTAINER

[75] Inventors: Thomas E. Doherty, Setauket, N.Y.; William F. Herzog, Perrysburg, Ohio

[73] Assignee: Owens-Illinois, Inc., Toledo, Ohio

[21] Appl. No.: 88,450

[22] Filed: Oct. 26, 1979

[51] Int. Cl.$^3$ .................. B29C 17/00; B29D 27/00
[52] U.S. Cl. .................. 425/391; 264/230; 264/296; 264/321; 264/DIG. 71; 425/319; 425/393; 425/817 R
[58] Field of Search .......... 264/296, 322, 320, 321, 264/553, 230, DIG. 71; 425/393, 391, 817 R, 392, 319

[56] References Cited

U.S. PATENT DOCUMENTS

| | | | |
|---|---|---|---|
| 3,065,677 | 11/1962 | Loeser | 264/296 X |
| 3,096,546 | 7/1963 | Edwards | 264/320 X |
| 3,271,503 | 9/1966 | Shelby | 264/296 X |
| 3,357,053 | 12/1967 | Lyon et al. | 264/553 X |
| 3,373,238 | 3/1968 | Powers et al. | 264/320 X |
| 3,557,275 | 1/1971 | Longshaw et al. | 264/296 |
| 3,917,788 | 11/1975 | Padovani | 264/296 X |
| 4,071,598 | 1/1978 | Meadors | 264/296 X |
| 4,121,402 | 10/1978 | Cress et al. | 264/321 X |

FOREIGN PATENT DOCUMENTS

| | | | |
|---|---|---|---|
| 38-24594 | 11/1963 | Japan | 264/296 |
| 1417798 | 12/1975 | United Kingdom | 264/320 |

Primary Examiner—Philip Anderson
Attorney, Agent, or Firm—David R. Birchall; Myron E. Click; David H. Wilson

[57] ABSTRACT

Apparatus for forming the rim on a foam plastic container such as a cup by use of a segmented rim former. The cavity in the rim former is contoured so as to produce a curled rim that is flat on the top. The flat top of the rim is parallel to the bottom of the cup.

The apparatus comprises a segmented rim former with a combination of linear and curved surfaces that form a noncircular container rim.

9 Claims, 4 Drawing Figures

U.S. Patent  Aug. 4, 1981  Sheet 2 of 2  4,281,979
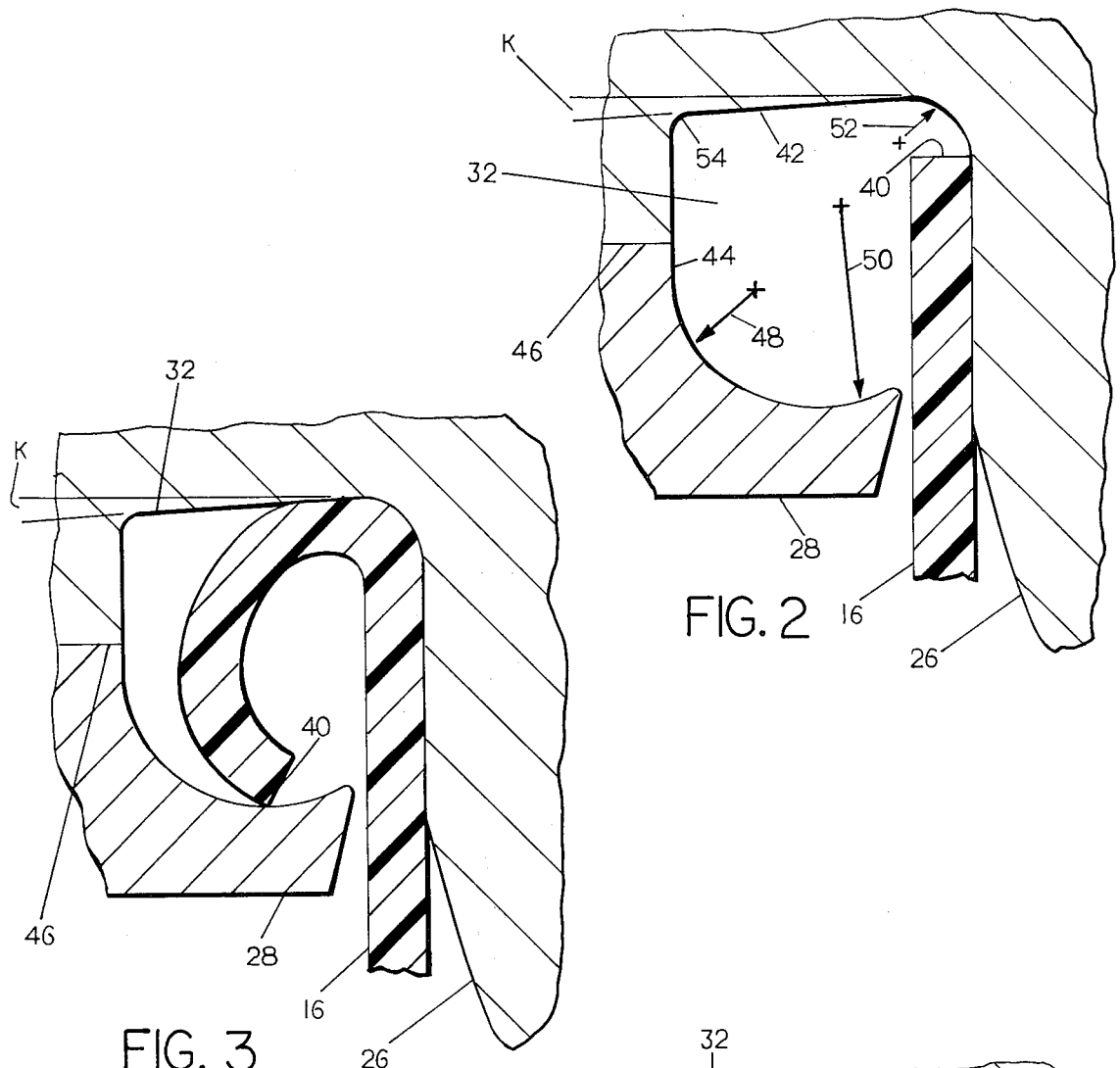
FIG. 2
FIG. 3
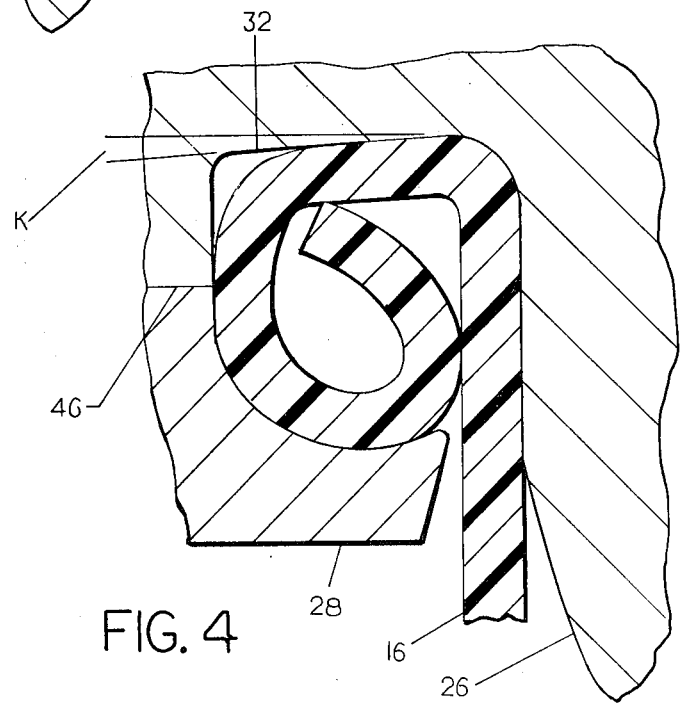
FIG. 4

APPARATUS TO FORM A FLAT-TOPPED RIM ON A THIN-WALLED FOAM PLASTIC CONTAINER

BACKGROUND OF THE INVENTION

This application relates generally to containers such as paper or plastic cups used with the dispensing of food products. In order to protect the food within the container from contamination and spillage, it has been common to seal a closure or foil membrane over the top of the cup. Common food products such as milk, juice, jelly and peanuts are packaged with heat sealed foil closures which can be peeled from the top of the cup or container.

In most instances the foil closure is sealed to the top rim of container by the application of heat. The seal between the foil and the container must be leakproof and also provide considerable resistance to being jarred loose by the movement of the product as the containers are transported from place to place.

There have been many approaches to designing an adequate seal between the foil and the top of the container. When the top of the container rim is substantially flat the integrity of the seal is enhanced to a considerable degree. To make a heat seal between a foil-type closure and a rounded top edge on a container requires that a heavy axial loading be applied to the foil. Some containers such as plastic cups collapse under axial loading, therefore, it is imperative that not only a leakproof seal be produced, but also it is important that the container does not collapse under the axial loading required during the sealing operation.

DESCRIPTION OF THE PRIOR ART

In the prior art it has been known to produce containers such as plastic cups with rims that are flat on the top. One such example of a plastic cup with a rim flat on the top is U.S. Pat. No. 3,357,053 issued Dec. 12, 1967 to W. B. Lyon, et al. In particular, FIG. 13 shows a cup rim that is of rolled configuration yet quite flat on the top. The flat top on the rim shown in U.S. Pat. No. 3,357,053 is produced by the application of pneumatic pressure applied by special air ducts that lead directly to the cup rim forming apparatus.

The prior art also contains several examples where the container is initially formed by matched male and female molds such as for example injection molding and steam chest molding. Where molding processes are employed the configuration of the container rim can be made to almost any desired configuration.

When the rim of a container is rolled, flat top surfaces have been created by post pressing which necessitates extra tooling and handling of the containers.

SUMMARY OF THE INVENTION

The present invention relates to containers in general. In particular, the invention relates to a apparatus for producing a rolled rim on a container such as a cup. The top of the cup rim is substantially flat, thus facilitating the sealing of a foil-type closure to the rim. The tooling for the cup rim contains a rim forming cavity that is contoured so that the rim assumes an initial arcuate configuration that is rapidly transformed to a rim flat on the top.

BRIEF DESCRIPTION OF THE DRAWINGS

FIG. 2 is an enlarged fragmented sectional view of the rimming cavity with a cup rim entering the cavity.

FIG. 3 is an enlarged sectional view similar to FIG. 1 which shows a partially formed cup rim.

FIG. 4 is an enlarged sectional view similar to FIG. 1 which shows a completed cup rim.

DESCRIPTION OF THE PREFERRED EMBODIMENT

Figure 1:
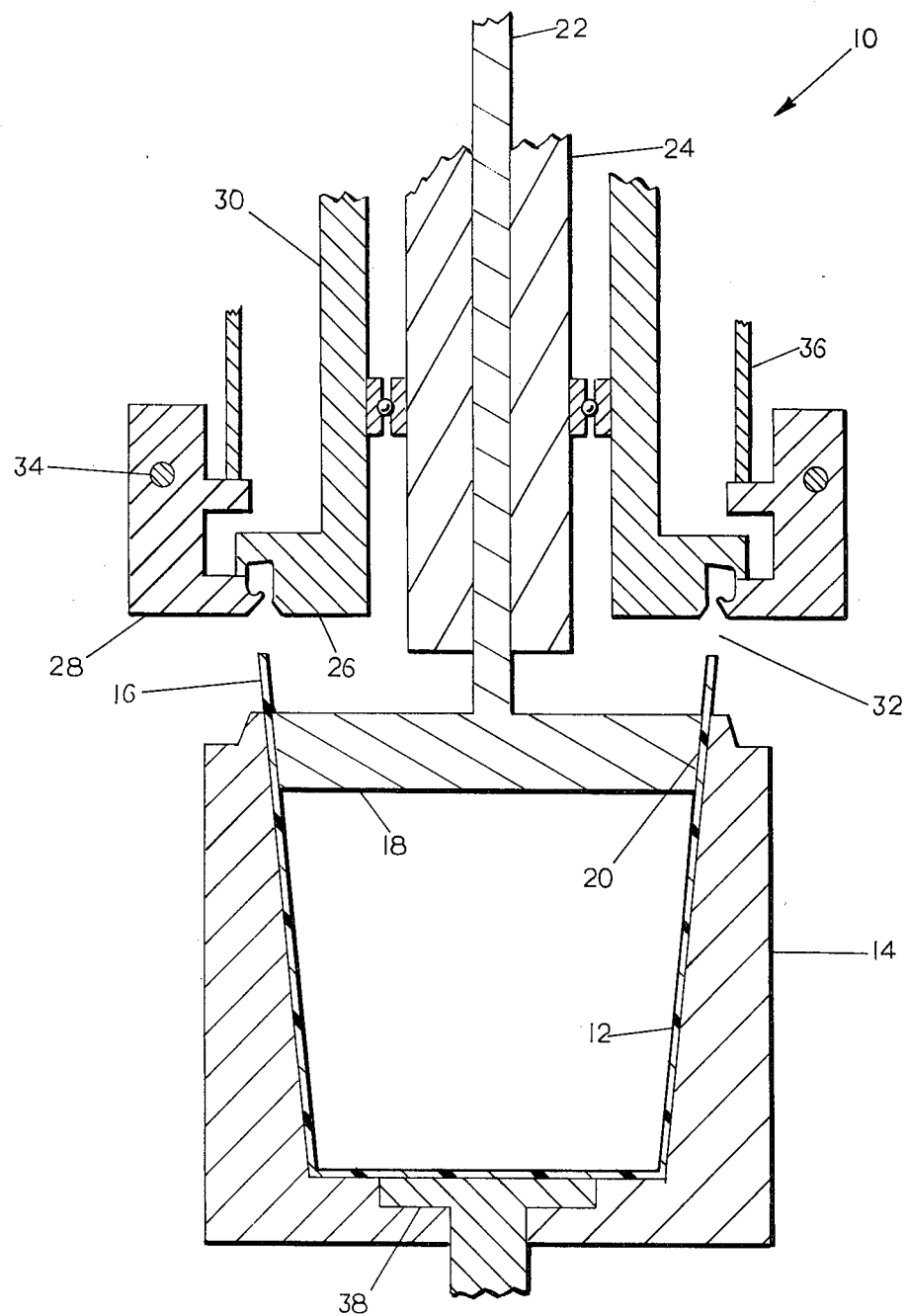
FIG. 1 is a sectional view which shows a standard cup rimming apparatus.

The containers or cups of the present invention are made with rims similar to the rims previously developed for paper cups. The material associated with the containers of the present invention is plastic material such as polyethylene foam. During the manufacture of a container or cup made according to the present invention, foam sheet material is extruded into tubular form where it is uniaxially or biaxially oriented. The foam sheet material is then printed on one side and cut into long strips which are then severed into blanks of rectangular configuration. The blanks are then formed to cylindrical configuration on a winding mandrel, coupled to a bottom member and heat shrunk to final configuration. The final configuration is generally frusto-conical or partly so. The partially formed container is then fed to a rim forming apparatus where the rim is curled outwardly and downwardly to produce a bead that is smooth and free of cracks. The bead is generally circular in configuration and the topmost edge of the cup is contained or tucked within the bead.

When the bead is formed on a paper cup the cavity utilized for the forming of the bead is circular in configuration and there is no great problem associated with forming the bead since paper has a tendency to adopt the configuration to which it has been last subjected.

Plastic materials such as sheet foam material can also be formed into desired circular cup rims by the addition of heat in one form or another to soften the plastic material prior or during the time which it is being worked.

FIG. 1 of the drawings shows in cross section a view of a standard rim forming tool. A plastic cup is introduced into the tooling and a rim is formed on the top edge of the cup. The overall apparatus is represented by numeral 10 and the cup upon which the rim is being produced is shown at 12. During the actual rim forming operation, cup 12 is loaded or positioned in cup holder 14. The internal cavity or configuration of cup holder 14 is similar to the external configuration of cup 12. The cup holder 14 provides support to the entire exterior sidewall of cup 12 except at the top 16 of the sidewall. The top sidewall section 16 is left to protrude from the cup holder 14 so that it can be formed into a rim.

Preferably, the cup is held in a steady or immovable position during the time which the rim is being formed, therefore, further stabilization is provided by plunger 18, which, although not shown, can be spring loaded. Plunger 18 is disc shaped and has an external surface 20 that conforms generally to the interior surface of cup 12. After cup 12 is positioned in cup holder 14, plunger 18 is moved into contact with the interior surface of cup 12 by lowering the nonrotating support shaft 24 and associated plunger rod 22. The nonrotating plunger 18 and the coupled rod 22 operates in a telescoping relationship with support shaft 24. The plunger 18 is capable of and does apply clamping pressure to the cup interior wall at 20, thus retaining the cup in an immovable and nonrotating position. Thus it can be seen that cup 12 is supported by cup holder 14, and particularly so, near the top of cup 12 where plunger 18 coacts with cup holder 14 to support the sidewall of cup 12.

The support shaft 24, previously mentioned, is part of an overall cup rimming assembly that can move toward and away from the cup holder 14. A set of cup rimming dies consisting of internal die 26 and external die 28 is mounted for rotary motion about support shaft 24. As depicted in FIG. 1, a bearing 30 is fixed to the nonrotating support shaft 24, thus providing means for the rotation of internal die 26 and external die 28 which is attached to the housing (not shown) that supports internal die 26. While not shown in its entirety, the external die 28 is segmented and consists of six or eight circular shaped pieces which coact to form part of a continuous bead cavity 32. The external die segments 28 are pivoted about a pivot 34 which is anchored to the previously mentioned housing. Each one of the external die segments 28 is activated by a push rod 36 or its equivalent. Thus when push rod 36 is moved in a downward direction external die 28 will rotate about pivot 34. As push rod 36 is moved in an upward direction, external die 28 will assume its normal position under the influence of springs or similar biasing means not shown but which are well within the skills of those familiar with the present art.

The individual parts of the cup rimming apparatus have been shown in the drawings and have been described in detail supra. During the cup rimming process, the cup 12 is held motionless by the clamping effect of cup holder 14 and plunger 18. The entire support shaft 24, including internal and external dies 26 and 28, is lowered in a direction toward the top sidewall section 16 of cup 12. The internal and exterior dies 26 and 28 are rotating about support shaft 24. The rotating dies 26 and 28 cause sidewall section 16 to be curled in an outward depending curl, thus forming a bead on the cup 12. After the bead is formed, push rod 36 causes external die 28 to rotate to a position from beneath the newly formed bead on cup 12. With the external die segments all in rotated position, the entire support shaft 24 can be moved away from cup 12, thus freeing its top edge or bead. Next, the plunger 18 is extracted from within cup 12. An ejector 38 is positioned in the bottom structure of cup holder 14 to facilitate the removal of the completed cup from cup holder 14.

The completed cups are then ready for the filling with a product and sealing with a closure made of foil.

FIG. 2 shows an enlarged fragmentary view of the bead cavity 32 formed by internal die 26 and external die 28. The top sidewall 16 of a plastic cup is also shown as the top edge 40 enters the bead cavity 32.

Normally the internal configuration of the bead cavity 32 is generally circular in configuration since container beads are preferred with a like configuration.

During the following discussion, the present invention will be described in terms of the cross section of the bead cavity, it being realized, of course, that the actual bead cavity is of toroidal configuration.

The internal configuration of the bead cavity 32 of the present invention is formed so that the resulting container bead will be flat on top. The top die section 42 of bead cavity 32 is generally flat as is the outside die section 44. The outside die section 44 extends over the juncture 46 formed by abutting parts of internal and external dies 26 and 28. The remainder of the bead cavity 32 is defined by radius 48 and radius 50.

In order to obtain a flat rim that is coincident with the top horizontal plane of the container, it is necessary to provide a negative angle at the top die section 42 of bead cavity 32 as shown by angle K in FIG. 2. It has been determined that negative angle K should not be less than 3 degrees. This amount of negative draft permits the foam plastic cup material to spring back to a position where the top surface of the bead will be substantially horizontal with the top plane of the cup.

During the beading operation, the support shaft and its accompanying internal and external dies 26 and 28 are moved in a downward direction toward the upstanding top sidewall 16 of cup 12 which is immobilized by cup holder 14 and plunger 18. Before the dies 26 and 28 actually make contact with the top cup edge 40, they are engaged in a rotary motion about support shaft 24. The rotating bead cavity 32 is moved downward until top cup edge 40 encounters sharp radius 52 of bead cavity 32.

FIG. 3 shows how the top cup edge 40 is immediately thrust into an outward arcuate configuration which causes top cup edge 40 to then move in a downward direction until it contacts the curved surface of external die 28 in the vicinity of radii 48 and 50. Since the top cup edge 40 is at this time not following any well defined curved surface, as would be present in standard circular bead apparatus, it jams against the surface of external die 28 and the remainder of top sidewall 16 begins to fill out the space within bead cavity 32. As the top sidewall 16 contacts most of the internal surface of bead cavity 32, enough resistance is generated by the backed up material in top sidewall 16 to cause top cup edge 40 to move further into a tight spiral, thus completing the bead.

FIG. 4 shows the completed cup bead within the bead cavity 32. The configuration shown in FIG. 4 represents the final configuration of the cup bead with the exception of the negative draft angle depicted by angle K. Once the cup bead is released from the confinement of bead cavity 32, the top of the bead assumes its horizontal attitude.

The present invention has been discovered to work well with containers fabricated of foam sheet stock, the composition of which is polystyrene. The foam sheet stock has a typical density in the range of 10–18 pounds per cubic foot. The overall thickness of the foam sheet stock is in the range of 0.015 to 0.040 inch.

The actual contour of the bead cavity 32 is a combination of radii. For example, it has been discovered that radius 52 should be smaller in length than radii 48 and 50. Radius 52 is 0.030 inch whereas radii 48 and 50 are respectively 0.050 and 0.080 inch. Also, radius 54 is 0.010 inch.

The resulting bead has a flat contour on the top that substantially matches the flat expanse of top die section 42. The flat top on the bead of the cup permits heat sealable closures to be attached thereto in a manner more reliable than was heretofore possible with the previous bead configuration that was circular in cross sectional configuration.

What is claimed is:

1. An apparatus for forming a flat-topped rim on a thin-walled container comprising a die cavity of toroidal configuration formed of an internal die section to which is attached a plurality of external die segments, an ingress for the insertion of a container top edge into said die cavity, said cavity when viewed in cross section being defined by an incoming first linear section for the guidance of the container top edge, a first arcuate section connected to said first linear section, a second linear section connected to said first arcuate section, a second arcuate section connected to said second linear section, a third linear section connected to said second arcuate section and a third arcuate section connected to said third linear section.

2. An apparatus as claimed in claim 1 wherein each of said arcuate sections is defined by radii.

3. An apparatus as claimed in claim 2 wherein the radius of said first arcuate section is larger than the radius of said second arcuate section.

4. An apparatus as claimed in claim 2 wherein said third arcuate section is defined by two different radii.

5. An apparatus as claimed in claim 4 wherein the smaller of said radii is adjacent said third linear section.

6. An apparatus as claimed in claim 5 wherein the radius of said first arcuate section is less than either of said different radii.

7. An apparatus as claimed in claim 5 wherein said third linear section is common to both said internal and external dies.

8. An apparatus as claimed in claim 5 wherein said second linear section is tapered with respect to a horizontal plane that is perpendicular to the longitudinal axis of said toroidal configuration.

9. An apparatus as claimed in claim 8 wherein the taper of said second linear section is at least three degrees.

* * * * *